United States Patent [19]
Cantaloupe et al.

[11] 3,919,384
[45] Nov. 11, 1975

[54] METHOD FOR EXTRUDING THIN-WALLED HONEYCOMBED STRUCTURES

[75] Inventors: Francis A. Cantaloupe, Horseheads; Rodney I. Frost, Corning; Louis M. Holleran, Painted Post, all of N.Y.

[73] Assignee: Corning Glass Works, Corning, N.Y.

[22] Filed: June 24, 1974

[21] Appl. No.: 482,643

Related U.S. Application Data

[63] Continuation-in-part of Ser. No. 340,023, March 12, 1973, abandoned.

[52] U.S. Cl............ 264/177 R; 264/209; 264/210
[51] Int. Cl.² B28B 21/52; B29D 23/04; B29F 3/00
[58] Field of Search. 264/177 R, 209, 210, DIG. 66, 264/150, 151, 296, 280, 119

[56] References Cited
UNITED STATES PATENTS

| | | | |
|---|---|---|---|
| 2,322,179 | 7/1941 | VanZwet | 106/39 |
| 3,038,201 | 6/1962 | Harkenrider | 425/192 |
| 3,824,196 | 7/1974 | Benbow et al. | 252/455 R |
| 3,836,302 | 9/1974 | Kaukeinen | 425/197 |

OTHER PUBLICATIONS

Thompson, "Forming Thin Ceramics," Ceramic Bul., Vol. 42, No. 9, (1963), pp. 480 and 481.
Treischel et al., "Study of Several Groups of Organic Binders...", J. Am. Cer. Soc. Vol. 29, 5, (1946), pp. 129–132, and Table II.
Dow Chem. Bul., "Thermal Gelation of Aqueous Solution," Methocel Product Information, (1966), pp. 1–4.

*Primary Examiner*—Robert F. White
*Assistant Examiner*—Willard E. Hoag
*Attorney, Agent, or Firm*—Richard N. Wardell; Clarence R. Patty, Jr.

[57] ABSTRACT

A thin-walled honeycombed structure is made by extruding a plastically deformable batch, including ceramic materials mixed with water and a methyl cellulose extrusion aid, through a die apparatus comprising an extrusion barrel, an extrusion die extending transversely across the barrel and a mask located around the periphery of the outlet face of the die for inwardly moving peripheral portions of the extruded structure to form an integral skin of material. The temperature of the batch as it is placed into the barrel is 2°–25°F. (preferably 5°–15°F.) above the gel point of such batch. The extrusion barrel is maintained at a temperature 0°–15°F. (preferably 5°–12°F.) less than the temperature of the ceramic batch placed in the barrel (and preferably not less than 5°F. below the gel point of the batch) to form a uniform skin of desired thickness on the honeycombed structure.

6 Claims, 5 Drawing Figures

METHOD FOR EXTRUDING THIN-WALLED HONEYCOMBED STRUCTURES

CROSS-REFERENCE TO RELATED APPLICATION

This is a continuation-in-part of application Ser. No. 340,023 filed Mar. 12, 1973, now abandoned.

BACKGROUND OF THE INVENTION

This invention pertains to the art of manufacturing extruded articles from an extrudable material such as particulate ceramic and/or metallic batches and similar materials which have a property of flow or plastic deformation during extrusion while becoming sufficiently rigid immediately thereafter so as to maintain their structural integrity.

In copending application Ser. No. 239,953 filed Mar. 31, 1972, now U.S. Pat. No. 3,836,302, a die apparatus is disclosed comprising a face plate or mask which overlies a portion of the discharge face of an extrusion die to provide an integral skin or casing about the extruded honeycombed structure. The mask which includes an inlet portion which tapers inwardly toward the axis of the extrusion die collapses the peripheral cells of the honeycombed structure near the outer surface of the extrusion to form an integral skin or casing about the extruded honeycombed structure as the extruded material passes through the orifice in the mask.

Ideally, the skin or casing of the honeycombed structure is thin and uniform throughout its entire length. It has been found that, in extruding particulate batches containing water and a methyl cellulose extrusion aid, the extrusion die apparatus described in the foregoing will collapse cells near the periphery so as to produce an out-of-round, excessively thick skin. This is extremely undersirable where the honeycombed structure is to be utilized as a catalyst support in an exhaust gas emission control device since such a skin does not meet specifications set for mounting of the structures. In addition, a skin too thick also reduces the thermal shock resistance of the structure. In other instances, the skin on the honeycombed structure will peel and tear when the die apparatus described in the foregoing is utilized. This, too, is undesirable since the structures will again fail to meet specifications for mounting in an emission control device. Also, the flaws in the skin act as sources for cracking.

SUMMARY OF THE INVENTION

It is therefore an object of this invention to provide an extruded monolithic honeycombed structure having a uniform skin or casing of desired thickness.

In accordance with this object, an extrusion die apparatus is provided comprising an extrusion barrel for receiving a plastically deformable extrusion batch, an extrusion die extending transversely across the barrel for forming cells of a honeycombed structure and a mask located at the outlet side of the extrusion die for inwardly moving peripheral portions of the extruded structure toward the extrusion axis so as to form an integral skin material. Temperature control means are located adjacent the extrusion barrel so as to maintain the temperature of the extrusion barrel about 0°–15°F. (preferably 5°–12°F.) less than the temperature of the extrusion batch placed in the extrusion barrel (and preferably not less than about the gel point of the batch as hereinafter defined or 5°F. below such point) so as to assure the formation of a uniform skin of desired thickness at the periphery of the honeycombed structure.

In a preferred embodiment of the invention, the temperature control means for the extrusion barrel comprises coils located adjacent the extrusion barrel for passing a fluid therethrough. By maintaining the temperature of the fluid at a level 0°–15°F. less than the temperature of the extrusion batch in the extrusion barrel, the extrusion barrel itself may be maintained at the appropriate temperature.

In accordance with this invention, the plastically deformable extrusion batch, at a temperature of about 2°–25°F. (preferably 5°–15°F.) above the gel point thereof, is first placed in the extrusion barrel which is maintained at a temperature of 0°–15°F. (preferably 5°–12°F.) less than the temperature of the extrusion batch placed therein (and advantageously not less than about 5°F. below or at the gel point of such batch). Pressure is then applied (preferably by a ram) to the extrusion batch which is forced through the extrusion die. As the extruded structure leaves the extrusion die, the mask collapses the peripheral cells of the structure to form the integral skin of the honeycombed structure. Since the extrusion barrel is maintained at a temperature of 0°–15°F. less than the temperature of the extrusion batch, the periphery of the extrusion batch in the barrel (which rubs or drags along the barrel generating frictional heating thereat) is maintained at substantially the same temperature as the interior of the extrusion batch therein, which allows the periphery of the extrusion batch to move at the same velocity as the interior of the extrusion batch and this creates a uniform skin of desired thickness on the extruded honeycombed structure.

In a particularly preferred embodiment of the invention, a ceramic extrusion batch is utilized comprising water, a mixture of refractory metal oxides and a methyl cellulose extrusion aid. The refractory metal oxides may consist essentially of silica, alumina and magnesium oxide.

It has been discovered that the ability of this invention to overcome the defects and deficiencies existing prior thereto (as described above) is related to a gelling condition of the extrudable batch containing water and methyl cellulose. As the temperature of such batch in a well mixed, plasticized and desired condition (with most or all of the methyl cellulose hydrated with or dissolved into the water therein) is increased from a temperature below the point at which the gelling effect occurs, the apparent viscosity thereof gradually decreases until the temperature reaches a level or point after which it is noted that, with continued increasing temperature, the apparent viscosity of the batch rises fairly rapidly. The temperature at that level or point at which the apparent viscosity of the batch becomes a minimum value is defined and referred to herein as the gel point of the batch.

In applying this invention, the extrusion batches are, in general, most easily extrudable at temperature and apparent viscosities close to or at their gel points. By maintaining the temperature of the interior and periphery of the extrusion batch substantially equilized as it moves along the extrusion barrel and through the die (which may also be cooled with fluid-cooling means), all portions of such batch will have substantially the same or similar apparent viscosities and resultant flow velocities.

DESCRIPTION OF PREFERRED EMBODIMENTS

Figure 1:
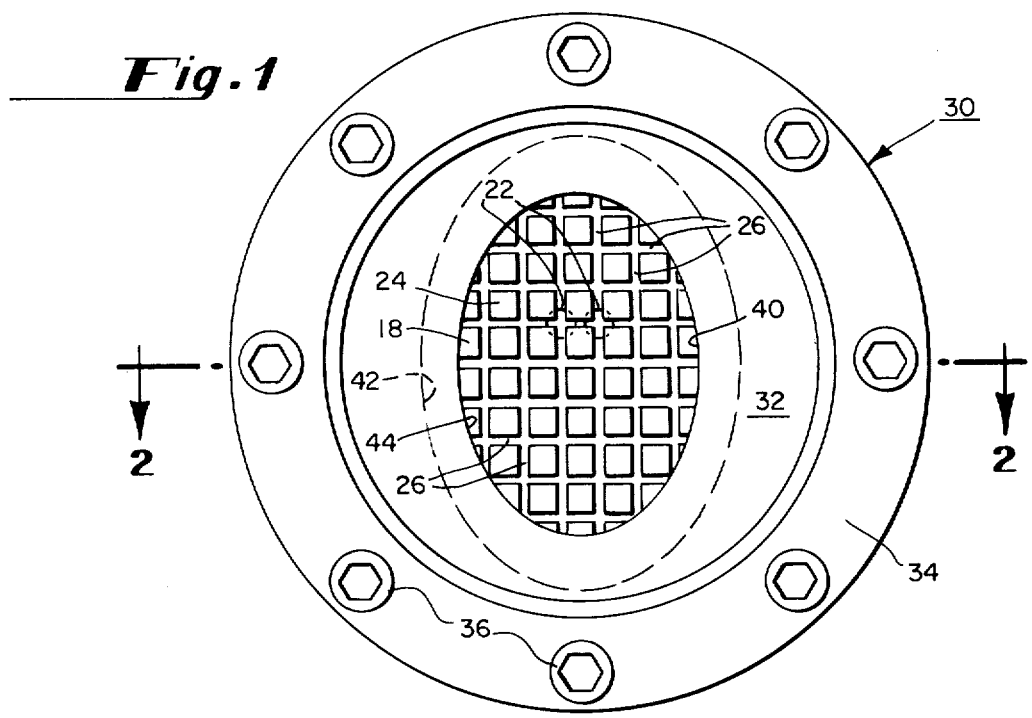
FIG. 1 is a bottom plan view of an extrusion die apparatus.
Figure 2:
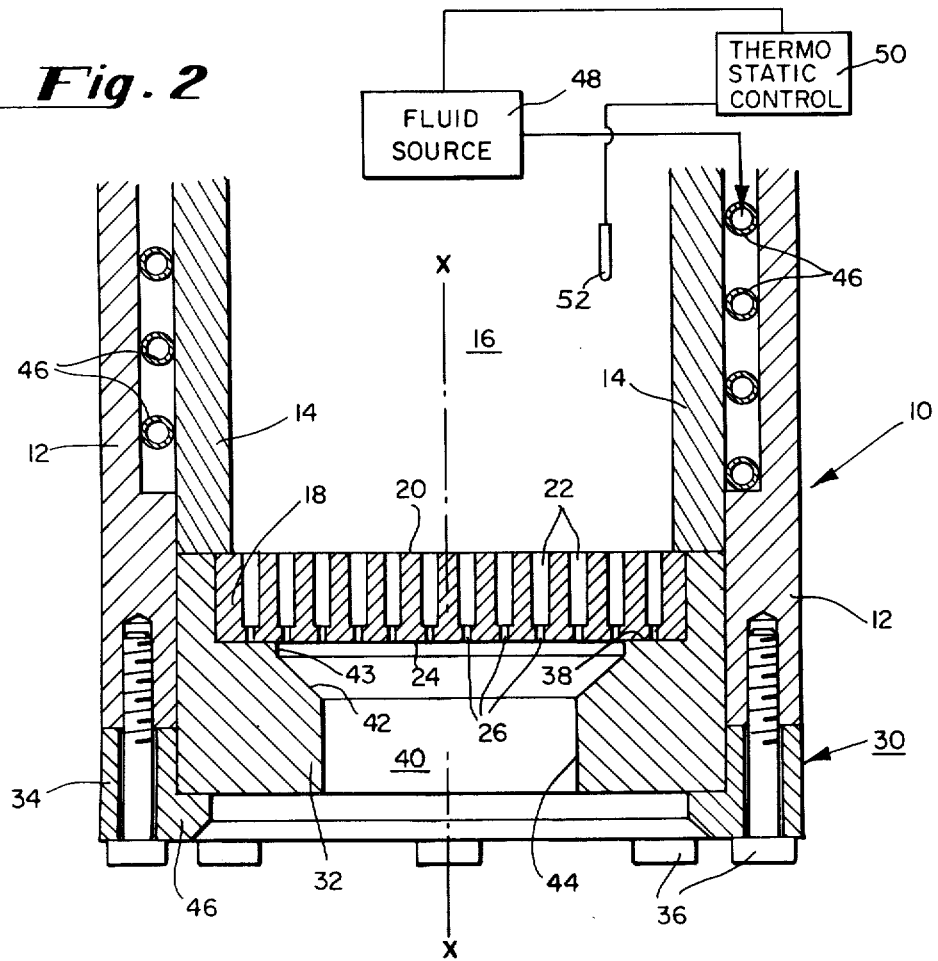
FIG. 2 is a sectional view of the extrusion die apparatus of FIG. 1 taken along line 2—2 with temperature control means in accordance with this invention.

Referring to FIGS. 1 and 2, an extrusion die apparatus 10 is shown including a support structure 12 for an extrusion barrel 14 which forms an extrusion chamber 16 receiving the extrusion batch. An extrusion die 18 of any desired configuration extends transversely across the extrusion barrel 14 adjacent the outlet end of the extrusion chamber 16. The die body 18 has an inlet face 20 provided with a plurality of openings for feed passageways 22 communicating with the extrusion chamber 16. The die body 18 also has an outlet face 24 which is provided with the interconnected discharge slots 26. The feed passageways 22 communicate with selected areas of the discharge slots 26 so as to deliver the batch material from the extrusion chamber 16 to the discharge slots 26. As shown in FIG. 1, the interconnected discharge slots 26 form a gridwork through which the batch material is extruded to form the matrix of a coherent honeycombed structure. Note that only two two of the passageways 22 are shown in FIG. 1 although similar passages communicate with each junction of the slots 26.

A mask or face plate ring assembly 30 is shown in position below the extrusion die 18. The face plate ring assembly 30 includes a face plate or mask 32, a retainer ring 34 and a plurality of bolts or cap screws 36 for readily removably securing the face plate 32 in position adjacent the outlet face 24 of die 18 by means of the retainer ring 34. The face plate 32 has a blocking surface 38 which is positioned adjacent the outlet face 24 of the die 18 and surrounds the central opening or orifice 40 of desired size and configuration extending through the face plate. In those cases where the area of the outlet face 24 containing discharge slots 26 is larger than the orifice 40, the blocking surface 38 restricts the flow of extrudable material through the die 18 to those areas which are in open communication with the orifice 40. In other words, the block surface 38 masks or blocks off the area of the outlet face 24 of extrusion die 18 which is not required for forming an article of the size and shape represented by the orifice 40 of the particular face plate or mask 32 being utilized.

The orifice 40 has a tapered inlet end portion 42 adjacent the outlet face 24 of the die which tapers toward the extrusion axis $x$—$x$ and an outlet portion 44 which is shown as substantially parallel to the axis of extrusion $x$—$x$. The tapered inlet end portion 42 forms an integral skin or casing at the periphery of the extruded honeycombed structure by moving the peripheral portion of the extruded structure radially inwardly toward the axis of the extrusion. Accordingly, the peripheral cells of the honeycombed structure collapse and form an integral skin or sheath about the remaining matrix of the article as it is being extruded.

Depending upon the particulate material being extruded, the angle of taper for portion 42 with respect to the axis of extrusion may vary anywhere from about 5° to about 60°, with the smaller taper being required for a greater longitudinal length through the face plate, whereas the larger taper, produces a sharper angle relative to the extrusion axis, and requires a greater force to compress the edge material radially inwardly for flow about the outlet portion 44. It has been found, however, that when an angle of taper of the inlet end portion 42 is greater than 30°, it is preferable to provide the inlet portion 42 with a straight entry zone 43 parallel with the axis of extrusion, so as to obtain a smoother skin about the article. The entry zone 43 may extend from the blocking surface 38 parallel to the axis of extrusion for a distance about 0.030–0.060 inches.

Figure 3:
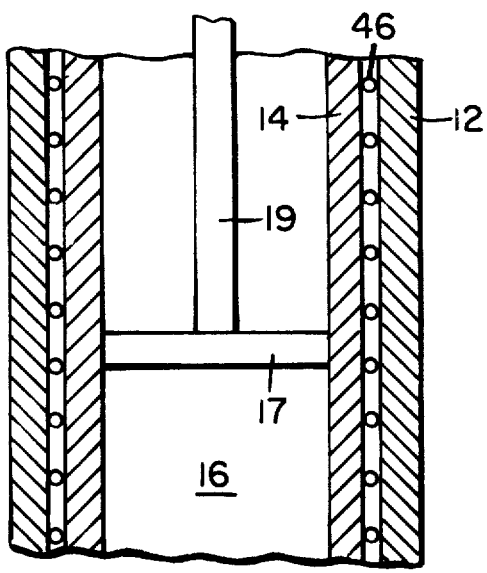
FIG. 3 is a sectional view of another portion of the extrusion apparatus as shown in FIG. 2, but further illustrating an extrusion ram within the extrusion barrel.

In accordance with this invention, the temperature of the extrusion barrel is controlled by tubing coils 46 which are located adjacent and in thermal communication with the extrusion barrel 14 in the support structure 12. These coils are supplied by a source 48 of fluid, e.g., water, which is maintained by a thermostatic control unit 50 at a temperature of 0°–15°F. less than the temperature of the extrusion batch. The preset temperature may be established by an operator or automatically set in response to the batch temperature sensed by a thermocouple 52 or other suitable temperature sensing means. The fluid which is circulated through the coil 46 maintains the temperature of the barrel 14 at 0°–15°F. less than the temperature of the extrusion batch in the extrusion chamber 16. This allows the periphery of the extrusion batch to be extruded at the same rate as the central portion of the extrusion batch as pressure is applied to such extrusion batch by a piston or ram 17 mounted on the end of a shaft 19 as shown in FIG. 3. Then, as the extruded structure passes through the orifice of the mask, the mask collapses the peripheral cells to form the uniform skin of desired thickness.

It has been found that very slight variations in the temperature between the extrusion barrel 14 and the extrusion batch within the chamber 16 will adversely affect the skin on the honeycombed structure. For example, it has been found that if the temperature of the extrusion barrel 16 is as little as 2°F. hotter than the temperature of the extrusion batch, when the temperature of the latter is at or above its gel point, the exterior portion of the extruded structure tends to lag the central portion of the extruded structure and tearing or peeling of the exterior portion or skin will result. On the other hand, if the barrel temperature is substantially cooler than such batch temperature, the exterior portion extrudes faster than the central portion and a smooth but excessively thick skin results. Thus it has been found that the extrusion barrel temperature should be in the range of 0°–15°F. (preferably 5°–12°F.) less than the batch temperature while the latter is 2°–25°F. (preferably 5°–15°F.) above the batch gel point for the optimum skin characteristic.

Figure 4:
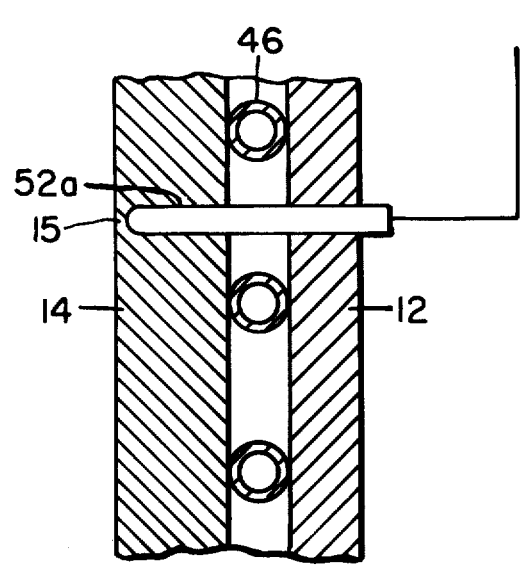
FIG. 4 is a sectional view of a portion of the extrusion barrel as shown in FIG. 2, but with a preferred alternate location of the thermocouple.

FIG. 4 shows a particularly preferred modification of the apparatus for this invention wherein thermocouple 52a is placed into the wall of barrel 14 so as to terminate close to but spaced from the inner surface of barrel 14, along which surface the peripheral portion of the extrusion batch flows. This arrangement permits proper sensing of the barrel temperature by the thermocouple 52a without having to partially obstruct the flow of the batch (as is the case with thermocouple 52 in FIG. 2).

In a particularly preferred embodiment of the invention, the extrusion batch is ceramic in nature. The ceramic material comprises 58.1% by weight of Sparks clay, 37.5% by weight of L. F. French talc and 4.4% by weight of A-2 alumina produced by the Aluminum Corporation of America. The particle sizes for the Sparks clay, L. F. French talc and the A-2 alumina are set forth in Table I:

Table I

| Particle Size in Microns | Sparks clay | % Particle Size L.F. French talc | A-2 alumina |
|---|---|---|---|
| 50 or less | — | 95.3% | — |
| 40 or less | — | 91.0% | 99.5% |
| 30 or less | 100.0% | 87.0% | 99.0% |
| 20 or Less | 92.5% | 74.3% | 98.9% |
| 10 or less | 79.0% | 46.3% | 90.5% |
| 5 or less | 52.5% | 23.6% | 39.8% |
| 2 or less | 31.0% | 8.9% | 7.1% |
| 1 or less | 23.0% | 4.1% | — |

Wet chemical analyses reveal that this ceramic dry batch and the Sparks clay and French talc ingredients comprise percentages by weight of various refractory metal oxides as set forth in Table II:

Table II

| Metal Oxides | Ceramic Dry Batch | Wet Chemical Analyses Sparks clay | L.F. French talc |
|---|---|---|---|
| $SiO_2$ | 51.39% | 55.2 % | 49.9 % |
| $Al_2O_3$ | 31.99% | 41.5 % | 9.4 % |
| $TiO_2$ | 0.22% | 0.08% | 0.38% |
| $Fe_2O_3$ | 1.58% | 1.30% | 1.73% |
| $Na_2O$ | 0.24% | — | — |
| $K_2O$ | 0.73% | 1.27% | 0.08% |
| CaO | 0.24% | 0.15% | 0.87% |
| MgO | 13.48% | 0.37% | 37.5 % |
| Loss on Ignition | — | 14.72% | 8.65% |

Figure 5:
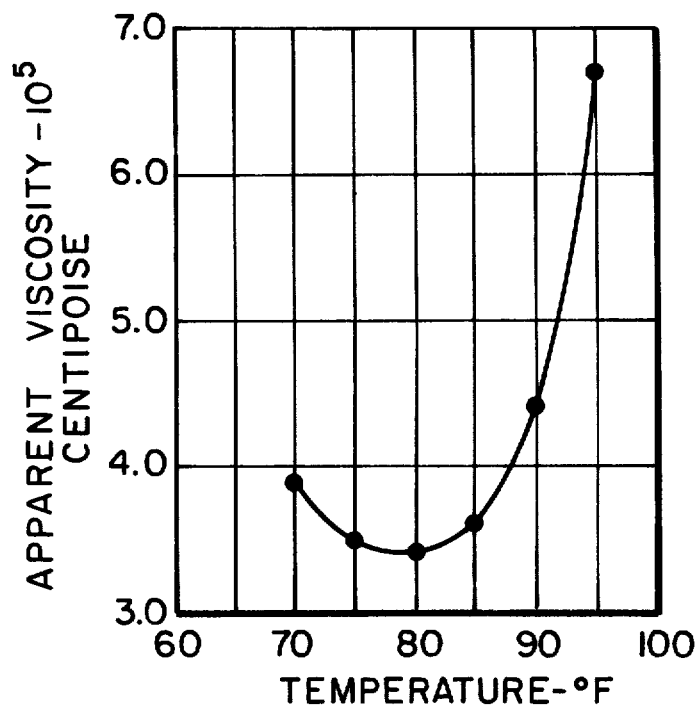
FIG. 5 is a plot of apparent viscosity versus temperature for one exemplary extrusion batch according to this invention.

The ceramic materials are blended with extrusion additives in the form of a methyl cellulose, such as Methocel 4000MC produced by the Dow Chemical Company, Midland, Mich. The blended batch may optionally include other extrusion aids, e.g., diglycol stearate, such as produced by Glyco Chemicals. The weight of the Methocel extrusion aid may vary from 1–7% of the ceramic material weight with 3–4% being preferred. When included, the diglycol stearate is suitably 0.5% by weight of the ceramic material. Water is added to equal 25–40% (preferably 28–32%) of the weight for the ceramic materials and the extrusion aid. Utilizing these particular mixtures, the extrusion batch temperatures are determined to be in the range of 75°–85°F. before being placed in extrusion chamber 16 and the temperature of the extrusion barrel is appropriately maintained so as to assure a barrel temperature 0°–15°F. less than the extrusion batch. Such determinations take into account the gel point of each mixture, which gel point varies with the relative portions of methyl cellulose to water as is known concerning mixtures of methyl cellulose and water. The foregoing temperatures of the batches, upon being placed into the extrusion barrel, are 2°–25°F. above the gel point of such batches. In a typical case where the batch was a mixture containing the above-noted ceramic material mixed for four minutes with 4% by weight of Methocel extrusion aid and 29% by weight of water addition (all ingredients initially at 70°F.) and further mulled for about 20 minutes until the batch was well plasticized, the variation in apparent viscosity with temperature for that batch was determined and is shown in FIG. 5 wherein the gel point of such batch is indicated to be about 80°F.

Other ceramic batches may be utilized including those described in copending application Ser. No. 384,935 filed Aug. 2, 1973 (assigned to the assignee of this application), which is incorporated herein by reference. In addition, the invention may be utilized in conjunction with extrusion batches comprising powdered metal with or without ceramic material, and similar inorganic materials which will plastically deform during extrusion and become immediately rigid thereafter so as to maintain structural integrity.

The term extruded honeycombed structure as used herein is intended to embrace any monolithic structure having open-ended cells extending along the extrusion axis of the structure. In the foregoing specification, the honeycombed structures have been oval in cross-section and the cells of the structure have been square in cross-section. If will, of course, be appreciated that the structures and cells may have other cross-sectional configurations such as those disclosed in copending application Ser. No. 346,606 filed Mar. 30, 1973 (assigned to the assignee of this application), incorporated herein by reference. These various configurations may be achieved by utilizing masks 32 having differently shaped orifices 40 and extrusion dies 18 having channels 26 arranged in different configurations. Also the number of cells per square inch of cross-sectional area may be varied as desired, e.g., from 60 to 600 cells per square inch (or even lesser or greater than that range).

Although a preferred embodiment of the invention has been described and various alternative suggested, it will be apparent to those skilled in the art that various changes and modifications may be made without departing from the true spirit and scope of the invention as set forth in the appended claims.

We claim:

1. A method of making a honeycombed structure by extruding a plastically deformable batch through a die apparatus comprising an extrusion die having an inlet face and an outlet face, an extrusion barrel in communication with the inlet face and an extrusion mask in communication with the outlet face, the method comprising the steps of placing a plastically deformable batch in the extrusion barrel prior to extrusion, forming the extrusion batch through the extrusion die to form an extruded honeycombed structure and forcing the extruded honeycombed structure through an orifice in the mask so as to move peripheral portions of the extruded structure inwardly toward the extrusion axis and collapse peripheral cells to form an integral skin of material at the periphery of the structure, the improvement comprising the steps of providing the batch as a blended mixture of particulate material containing water and methyl cellulose and having a gel point, providing the batch at the time of placing it in the barrel with a temperature of about 2°–25°F. above the gel point of the batch, and maintaining the temperature of the extrusion barrel about 0°–15°F. less than the temperature of the batch placed in the barrel so as to form a substantially uniform skin at the periphery of the structure.

2. The method of claim 1 wherein the temperature of the batch placed in the barrel is about 5°–15°F. above the gel point of the batch and the temperature of the barrel is about 5°–12°F. below the temperature of the batch placed in the barrel.

3. The method of claim 2 wherein the temperature of the barrel is not less than 5°F. below the gel point of the batch.

4. The method of claim 3 wherein the particulate material is a mixture of refractory metal oxides.

5. The method of claim 4 wherein the refractory metal oxides comprise silica, alumina and magnesium oxide.

6. The method of claim 5 wherein the methyl cellulose is 1–7% by weight of the oxides and the water is 25–40% by weight of the oxides plus methyl cellulose.

* * * * *

UNITED STATES PATENT OFFICE
CERTIFICATE OF CORRECTION

PATENT NO. : 3,919,384
DATED : November 11, 1975
INVENTOR(S) : Francis A. Cantaloupe, Rodney I. Frost, Louis M. Holleran It is certified that error appears in the above–identified patent and that said Letters Patent are hereby corrected as shown below:

Column 6, line 25, change "If" to -- It -- .

Column 6, line 51, change "forming" to -- forcing -- .

Signed and Sealed this ninth Day of March 1976

[SEAL]

Attest:

RUTH C. MASON
Attesting Officer

C. MARSHALL DANN
Commissioner of Patents and Trademarks